United States Patent
Jeong et al.

(10) Patent No.: US 9,827,882 B2
(45) Date of Patent: Nov. 28, 2017

(54) APPARATUS FOR RECLINING REAR SEAT FOR VEHICLE

(71) Applicants: Hyundai Motor Company, Seoul (KR); Kia Motors Corporation, Seoul (KR)

(72) Inventors: Chan Ho Jeong, Gyeonggi-do (KR); Seon Chae Na, Gyeonggi-do (KR); Jung Sang You, Gyeonggi-do (KR); Young Bok Sung, Gyeonggi-do (KR); Sang Uk Yu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 14/990,915

(22) Filed: Jan. 8, 2016

(65) Prior Publication Data
US 2017/0096086 A1    Apr. 6, 2017

(30) Foreign Application Priority Data
Oct. 2, 2015    (KR) .......................... 10-2015-0139023

(51) Int. Cl.
*B60N 2/20*    (2006.01)
*B60N 2/22*    (2006.01)

(52) U.S. Cl.
CPC ............ *B60N 2/2209* (2013.01); *B60N 2/20* (2013.01); *B60N 2/22* (2013.01); *B60N 2/2236* (2013.01)

(58) Field of Classification Search
CPC .......... B60N 2/20; B60N 2/22; B60N 2/2209; B60N 2/2236

USPC ............................................ 296/65.16, 65.17
See application file for complete search history.

(56) References Cited

U.S. PATENT DOCUMENTS

| | | | | |
|---|---|---|---|---|
| 1,414,637 A | * | 5/1922 | Gell ................... | A47C 1/03238 |
| | | | | 248/420 |
| 5,112,109 A | * | 5/1992 | Takada ................. | B60N 2/2222 |
| | | | | 297/320 |
| 7,762,604 B1 | * | 7/2010 | Lindsay ............. | B60N 2/01583 |
| | | | | 296/64 |
| 8,303,018 B2 | * | 11/2012 | Zambon ............... | B60N 2/3031 |
| | | | | 248/503.1 |

(Continued)

FOREIGN PATENT DOCUMENTS

| JP | 2002-144926 A | 5/2002 |
|---|---|---|
| JP | 3452285 B2 | 9/2003 |

(Continued)

*Primary Examiner* — Gregory Blankenship
(74) *Attorney, Agent, or Firm* — Mintz Levin Cohn Ferris Glovsky and Popeo, P.C.; Peter F. Corless

(57) ABSTRACT

An apparatus for reclining a rear seat for a vehicle is provided. The apparatus includes a seat cushion frame that is connected to a floor via an operation part and is configured to move forward while rotating when the operation part is operated. Additionally, front and rear ends of the seat cushion frame are configured to rotate relative to the floor, respectively, by a link. A seat back frame includes a guide pin and a lower end of the seat back frame is mounted to the rear end of the seat cushion frame to slide while rotating, and an upper end of the seat back frame is rotatably connected to a vehicle body. A guide bracket is fixedly mounted to the vehicle body, with the guide pin of the seat back frame being connected to the guide bracket to allow the guide pin to slide.

9 Claims, 8 Drawing Sheets

(56) References Cited

U.S. PATENT DOCUMENTS

| | | | |
|---|---|---|---|
| 9,381,830 B2* | 7/2016 | Jeong | B60N 2/22 |
| 9,573,490 B1* | 2/2017 | Poniatowski | B60N 2/0292 |
| 2005/0017561 A1* | 1/2005 | Burmeister, III | B60N 2/015 |
| | | | 297/354.12 |
| 2007/0096497 A1* | 5/2007 | Adragna | B60N 2/2209 |
| | | | 296/65.16 |
| 2007/0210633 A1* | 9/2007 | Proctor | A47C 1/03222 |
| | | | 297/300.1 |
| 2008/0164740 A1* | 7/2008 | Harper | B60N 2/045 |
| | | | 297/331 |
| 2009/0236880 A1* | 9/2009 | Villeminey | B60N 2/2209 |
| | | | 297/188.01 |
| 2009/0322134 A1 | 12/2009 | Yamada et al. | |
| 2010/0237673 A1* | 9/2010 | Lindsay | B60N 2/2245 |
| | | | 297/378.13 |
| 2011/0187171 A1* | 8/2011 | Ishii | B60N 2/22 |
| | | | 297/354.12 |
| 2012/0025557 A1* | 2/2012 | Lindsay | B60N 2/366 |
| | | | 296/65.16 |
| 2013/0049425 A1* | 2/2013 | Runde | B60N 2/206 |
| | | | 297/354.12 |
| 2015/0108813 A1* | 4/2015 | Muller | B60N 2/2209 |
| | | | 297/362.11 |
| 2015/0137547 A1* | 5/2015 | Cai | B60N 2/366 |
| | | | 296/63 |
| 2015/0165935 A1* | 6/2015 | Sachs | B60N 2/22 |
| | | | 297/342 |
| 2016/0016488 A1* | 1/2016 | Farooq | B60N 2/20 |
| | | | 297/354.12 |
| 2017/0096086 A1* | 4/2017 | Jeong | B60N 2/20 |

FOREIGN PATENT DOCUMENTS

| | | |
|---|---|---|
| JP | 3541868 | 7/2004 |
| JP | 2009-089871 A | 4/2009 |
| JP | 4856911 B2 | 1/2012 |
| JP | 5220319 B2 | 6/2013 |
| KR | 20-1997-0002186 | 1/1997 |
| KR | 20-1999-0001460 | 1/1999 |
| KR | 10-2003-0003487 | 1/2003 |
| KR | 10-2009-0024831 | 3/2009 |
| KR | 10-2009-0131572 | 12/2009 |
| KR | 10-2009-0131572 A | 12/2009 |
| KR | 10-2012-0063371 | 6/2012 |
| KR | 10-1252499 | 4/2013 |
| KR | 10-2013-0068949 | 6/2013 |
| KR | 10-1317653 B1 | 10/2013 |
| KR | 10-1326505 | 11/2013 |
| KR | 10-1406449 | 6/2014 |
| KR | 10-1406449 B1 | 6/2014 |
| KR | 20-2015-0000160 | 1/2015 |
| KR | 10-2015-0077624 | 7/2015 |

* cited by examiner

APPARATUS FOR RECLINING REAR SEAT FOR VEHICLE

CROSS REFERENCE TO RELATED APPLICATION

The present application claims priority of Korean Patent Application Number 10-2015-0139023 filed on Oct. 2, 2015, the entire contents of which application are incorporated herein for all purposes by this reference.

BACKGROUND

Field of the Invention

The present invention generally relates to an apparatus for reclining a rear seat for a vehicle, the apparatus being capable of reclining a seat back while a seat cushion moves.

Description of the Related Art

Generally, a passenger vehicle includes front seats on which a driver and a passenger sit and rear seats for additional passengers. A conventional rear seat does not have any apparatus for reclining the seat due to spatial constraints of a passenger vehicle. Thus, a passenger in the rear seat sits in a same position for a longer period of time than a passenger of the front seat and user convenience is also decreased.

Traditionally, a reclining device is installed in both sides of a rear seat to rotate a seat back of the rear seat relative to a seat cushion. However, it is possible to recline only the seat back, but not the seat cushion interlocked with the seat back. Thus, it may be difficult to offer riding comfort to a passenger of the rear seat by adjusting only the angle of the seat back.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus for reclining a rear seat for a vehicle, in which the angle of a seat back of the rear seat may be changed interlocked with a movement of a seat cushion, and thus the seat cushion and the seat back may be reclined simultaneously, to improve riding comfort to a passenger of the rear seat.

According to one aspect of the present invention, an apparatus for reclining a rear seat for a vehicle may include: a seat cushion frame connected to a floor via an operation part and configured to move forward while rotating when the operation part is operated, wherein a front end and a rear end of the seat cushion frame are configured to move while rotating relative to the floor, respectively, by a link; a seat back frame provided with a guide pin, wherein a lower end of the seat back frame may be mounted to the rear end of the seat cushion frame to be capable of sliding while rotating, and an upper end of the seat back frame may be connected to a vehicle body to be capable of rotating; and a guide bracket fixedly mounted to the vehicle body, with the guide pin of the seat back frame being connected to the guide bracket to allow the guide pin to slide.

The front end of the seat cushion frame may be rotatably mounted to the floor via a first link, and the rear end of the seat cushion frame may be rotatably mounted to the floor via a second link, wherein the seat cushion frame may be configured to move forward while rotating by rotations of the first and the second links when the operation part is operated. The operation part may include: a drive motor disposed on the front end of the seat cushion frame; and a lead screw that extends rearward from the drive motor and connected to the floor, wherein when the drive motor is operated, the drive motor may be configured to move along the lead screw, and thereby the seat cushion frame moves while rotating.

The rear end of the seat cushion frame may include a locking bracket having a slide groove, and the lower end of the seat back frame may include a movable pin, the movable pin may be engaged with the slide groove and moving along the slide groove. The slide groove of the locking bracket may extend curvedly in a direction in which the seat cushion frame moves forward while rotating when the operation part is operated. The apparatus may further include: a coupling element disposed in an upper end of the seat back frame, the coupling element extending downward; and a support element disposed on the vehicle body, wherein the coupling element of the seat back frame may be rotatably coupled to the support element and thus, the support element may support a rotation of the seat back frame.

The support element may be open in an upper end thereof to allow the coupling element to be inserted into the support element from an upside to a downside, the support element being configured to surround the coupling element when the coupling element is inserted into the support element. The guide bracket may be fixedly mounted to the vehicle body at a location adjacent to the guide pin, with a guide slot disposed in the guide bracket by extending in a forward or a backward direction, wherein the guide pin may be inserted into the guide slot. The guide slot of the guide bracket may extend upward and forward and the guide slot of the guide bracket may extend upward and downward.

According to the apparatus for reclining a rear seat for a vehicle configured by a description above, the angle of a seat back of the rear seat may be changed interlocked with a movement of a seat cushion, and thus the seat cushion and the seat back may be reclined simultaneously, to thus improve riding comfort to a passenger of the rear seat. In particular, in the apparatus of the present invention when the seat cushion moves and the angle of the seat back changes, the variation in height may be absorbed. Therefore, even when the seat cushion and the seat back move, a comfortable posture of a passenger may be maintained.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Figure 1:
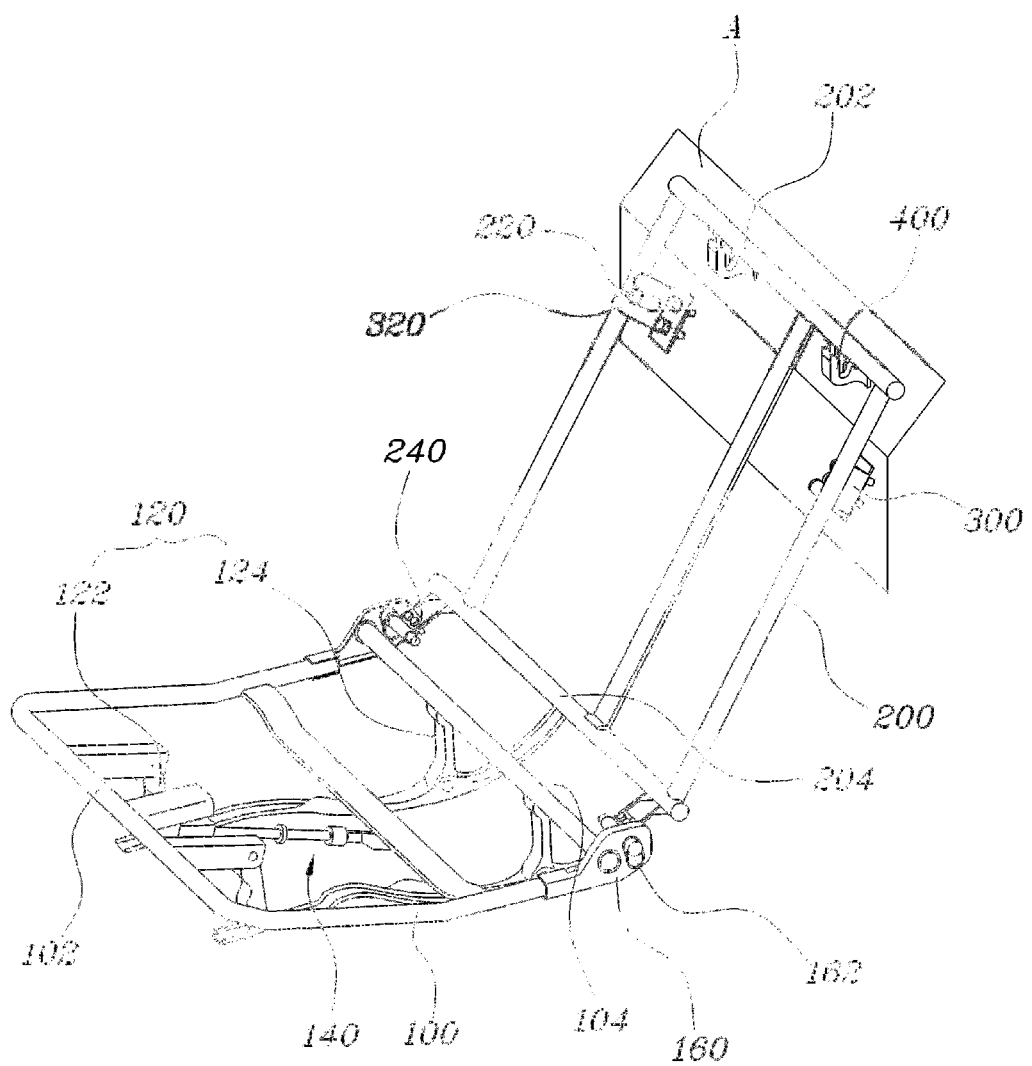
FIG. 1 is a view showing an apparatus for reclining a rear seat for a vehicle according to an exemplary embodiment of the present invention.
Figure 2:
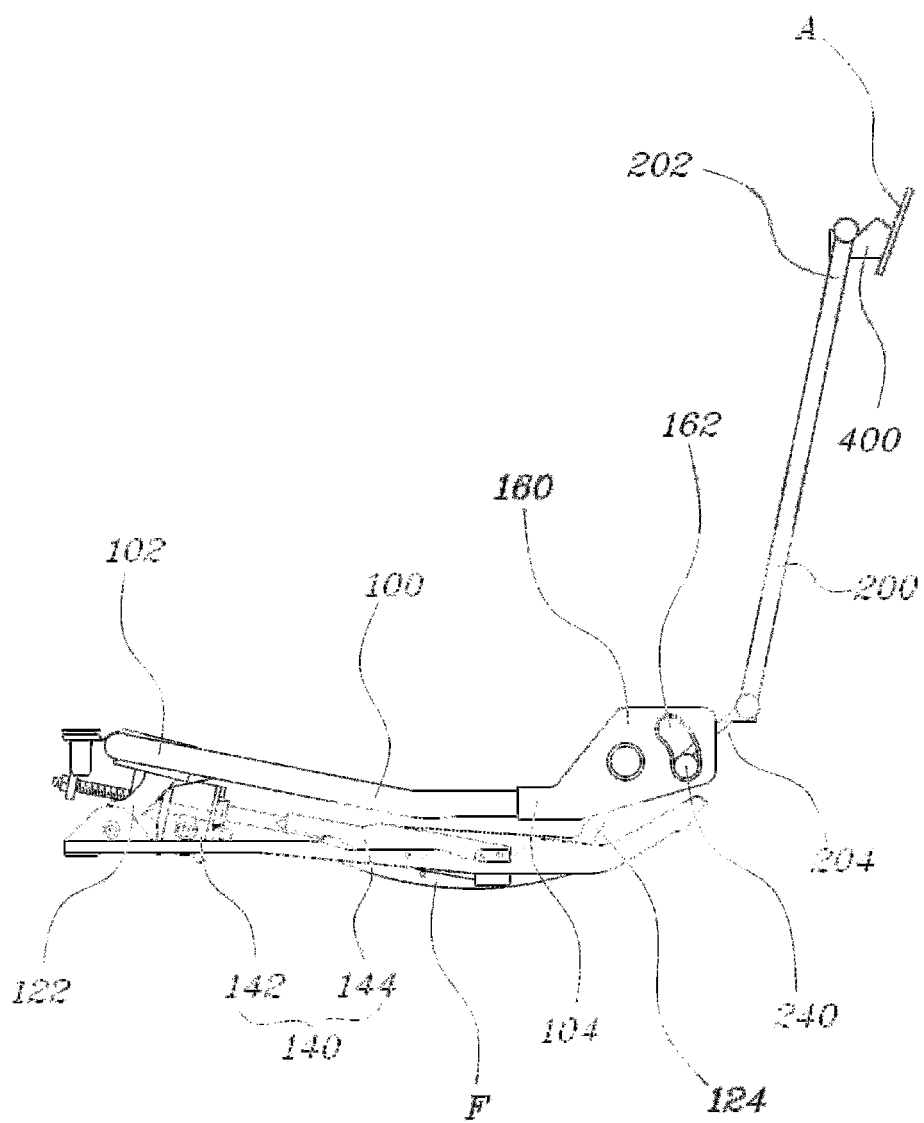
FIGS. 2 to 3 are side views illustrating the apparatus of FIG. 1 according to an exemplary embodiment of the present invention.
Figure 3:
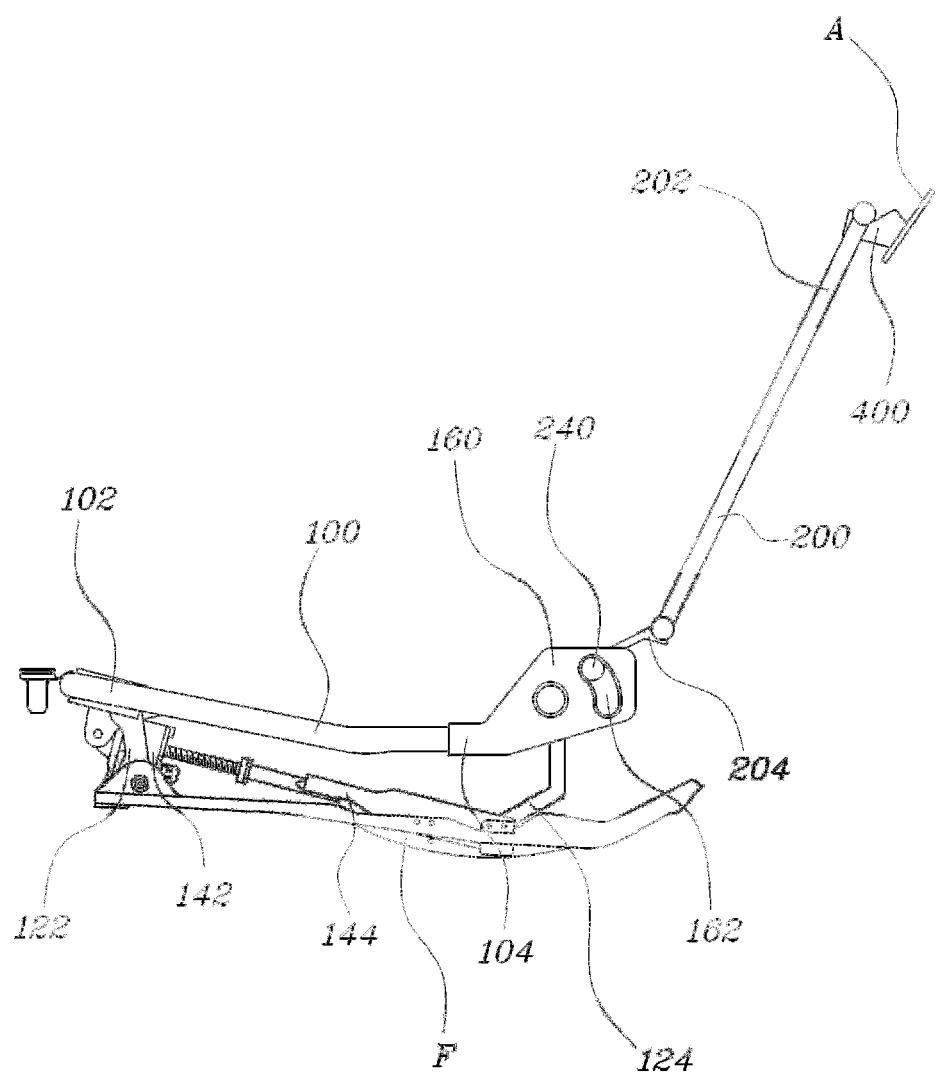

Hereinbelow, an apparatus for reclining a rear seat for a vehicle according to an exemplary embodiment of the present invention will be described with reference to the accompanying drawings. FIG. 1 is a view showing an apparatus for reclining a rear seat for a vehicle according to an exemplary embodiment of the present invention. FIGS. 2 to 3 are side views illustrating the apparatus of FIG. 1. FIGS. 4 to 8 are views illustrating the apparatus of FIG. 1.

As shown in FIG. 1, the apparatus for reclining a rear seat for a vehicle according to the exemplary embodiment of the present invention may include: a seat cushion frame 100 connected to a floor F via an operation part 140 and configured to move forward while rotating when the operation part 140 is operated, wherein a front end 102 and a rear end 104 of the seat cushion frame 100 are configured to move relative to the floor F by a link 120; a seat back frame 200 having a guide pin 220, wherein a lower end 204 of the seat back frame 200 may be mounted to the rear end 104 of the seat cushion frame 100 to be capable of sliding while rotating, and an upper end 202 of the seat back frame 200 may be rotatably connected to a vehicle body A; and a guide bracket 300 fixedly mounted to the vehicle body A, with the guide pin 220 of the seat back frame 200 being connected to the guide bracket 300 to allow the guide pin 220 to slide along the guide bracket 300.

As described above, the seat cushion frame 100 and the seat back frame 200 may be rotatably connected to each other. In particular, the seat back frame 200 may be rotatably connected to the vehicle body A. The seat cushion frame 100 may be configured to move forward while rotating when the operation part 140 is operated on the floor F. Therefore, the seat cushion frame 100 and the seat back frame 200 may be configured to move simultaneously.

In particular, the seat cushion frame 100 and the seat back frame 200 may be connected to each other to be capable of sliding while rotating. The seat back frame 200 may be connected to the vehicle body A via the guide bracket 300 to be capable of sliding while rotating. Thus, when the operation part 140 is operated the seat cushion frame 100 may be configured to move while rotating. Hereunder, when the seat back frame 200 rotates, a variation in height may be absorbed by the seat back frame 200 that slides while rotating. Thereby, when the seat cushion moves and the angle of the seat back changes, the variation in height may be absorbed. Therefore, even when the seat cushion and the seat back move, a comfortable posture of a passenger may be maintained.

As shown in FIGS. 1 to 2, the front end 102 of the seat cushion frame 100 may be rotatably mounted to the floor F via a first link 122, and the rear end 104 of the seat cushion frame 100 may be rotatably mounted to the floor F via a second link 124, wherein the seat cushion frame 100 may be configured to move forward while rotating by rotations of the first and the second links 122 and 124 when the operation part 140 is operated.

In other words, first ends of the first link 122 and the second link 124 may be rotatably connected to the front end 102 and the rear end 104 of the seat cushion frame 100 respectively; second ends of the first link 122 and the second link 124 may be rotatably connected to the floor F; thereby, the seat cushion frame 100 may be configured to move forward or backward while rotating. That is, the first link 122 and the second link 124 bear a weight of the seat cushion frame 100, allowing the seat cushion frame 100 to rotate based on the rotations of the first and the second links 122 and 124. The link 120 may be a plurality of links to improve weight-bearing capacity. In addition, the link 120 may be mounted to the floor F directly, and may be mounted to the floor F via an additional bracket, wherein the additional bracket may be mounted to the floor F or to a rail disposed on the floor F to allow the seat cushion frame 100 to slide forward or backward.

Meanwhile, the operation part 140 may include: a drive motor 142 disposed on the front end 102 of the seat cushion frame 100; and a lead screw 144 that extends rearward from the drive motor 142 and connected to the floor F. When the drive motor 142 is operated, the drive motor 142 may be configured to move along the lead screw 144, and thereby the seat cushion frame 100 may move while rotating.

As shown in FIGS. 2 to 3, the drive motor 142 may be fixedly mounted to the front end 102 of the seat cushion frame 100, and the lead screw 144 that extends rearward from the drive motor 142 may be fixedly mounted to the floor F. In other words, when the drive motor 142 of the operation part 140 is operated and rotates, the drive motor 142 may be configured to move along the thread of the lead screw 144. Thus, the seat cushion frame 100 may be configured to move forward along with the drive motor 142, and at the same time the seat cushion frame 100 may be configured to move forward while rotating by the link 120 connected to the seat cushion frame 100. The drive motor 142 may be operated by an additional controller in response to user manipulation. Further, the drive motor 142 may be configured to move the seat cushion frame 100 forward or backward while rotating using a reversible motor that is capable of rotating in opposite directions.

Figure 4:
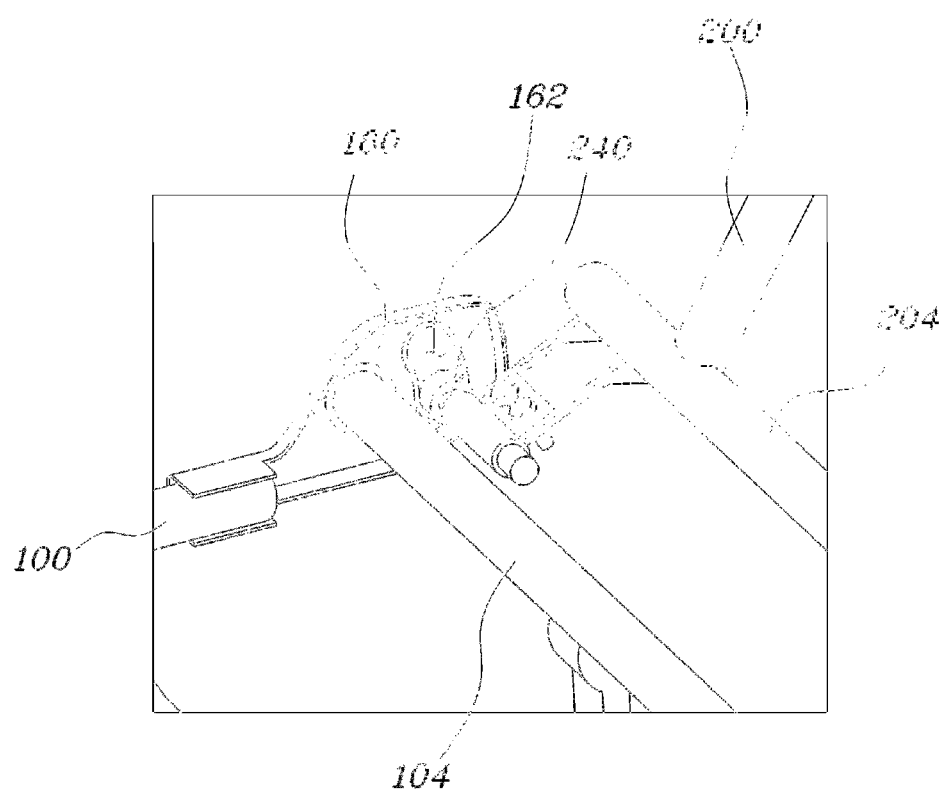
FIGS. 4 to 8 are views illustrating the apparatus of FIG. 1 according to an exemplary embodiment of the present invention.
Figure 5:
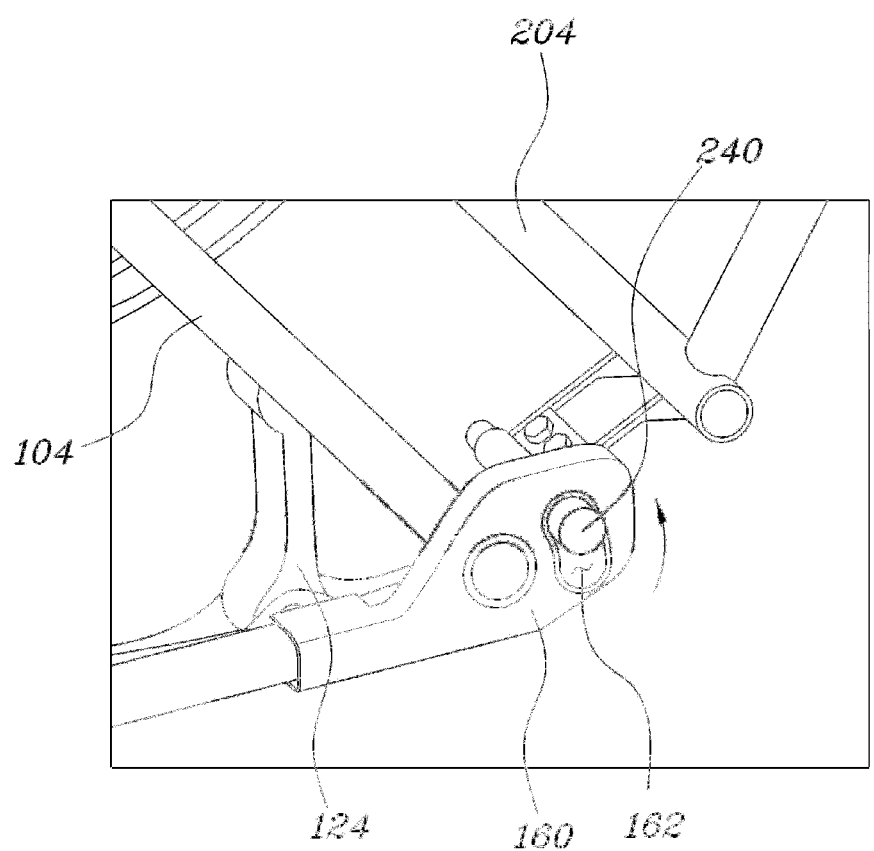

Meanwhile, as shown in FIGS. 4 to 5, the rear end 104 of the seat cushion frame 100 may include a locking bracket 160 having a slide groove 162, and the lower end 204 of the seat back frame 200 may include a movable pin 240, the movable pin 240 being engaged with the slide groove 162 and moving along the slide groove 162. In other words, the seat cushion frame 100 may include the locking bracket 160 having the slide groove 162. The seat back frame 200 may include the movable pin 240 engaged with the slide groove 162 of the locking bracket 160. Therefore, when the operation part 140 is operated and the seat cushion frame 100 moves while rotating, the movable pin 240 of the seat back frame 200 may be configured to move along the slide groove 162 of the seat cushion frame 100.

According to an exemplary embodiment of the present invention, the seat cushion frame 100 may be configured to move forward while rotating by the link 120. In particular, the seat cushion frame 100 may be configured to rotate upward. The slide groove 162 of the locking bracket 160 may be configured to absorb an upward movement of the seat cushion frame 100, and thereby the seat cushion frame 100 may be configured to move forward without an upward movement thereof. The slide groove 162 of the locking bracket 160 may extend curvedly (e.g., extend in a curve shape) in a direction in which the seat cushion frame 100 moves forward while rotating when the operation part 140 is operated. Similarly, the slide groove 162 may extend curvedly in a same direction as that of the seat cushion frame 100 moves while rotating by the link 120. Therefore, when the operation part 140 is operated and the seat cushion frame 100 moves while rotating, the movable pin 240 of the seat back frame 200 may be configured to move more smoothly along the slide groove 162, and therefore the rotation of the seat cushion frame 100 may be performed more smoothly.

Figure 6:
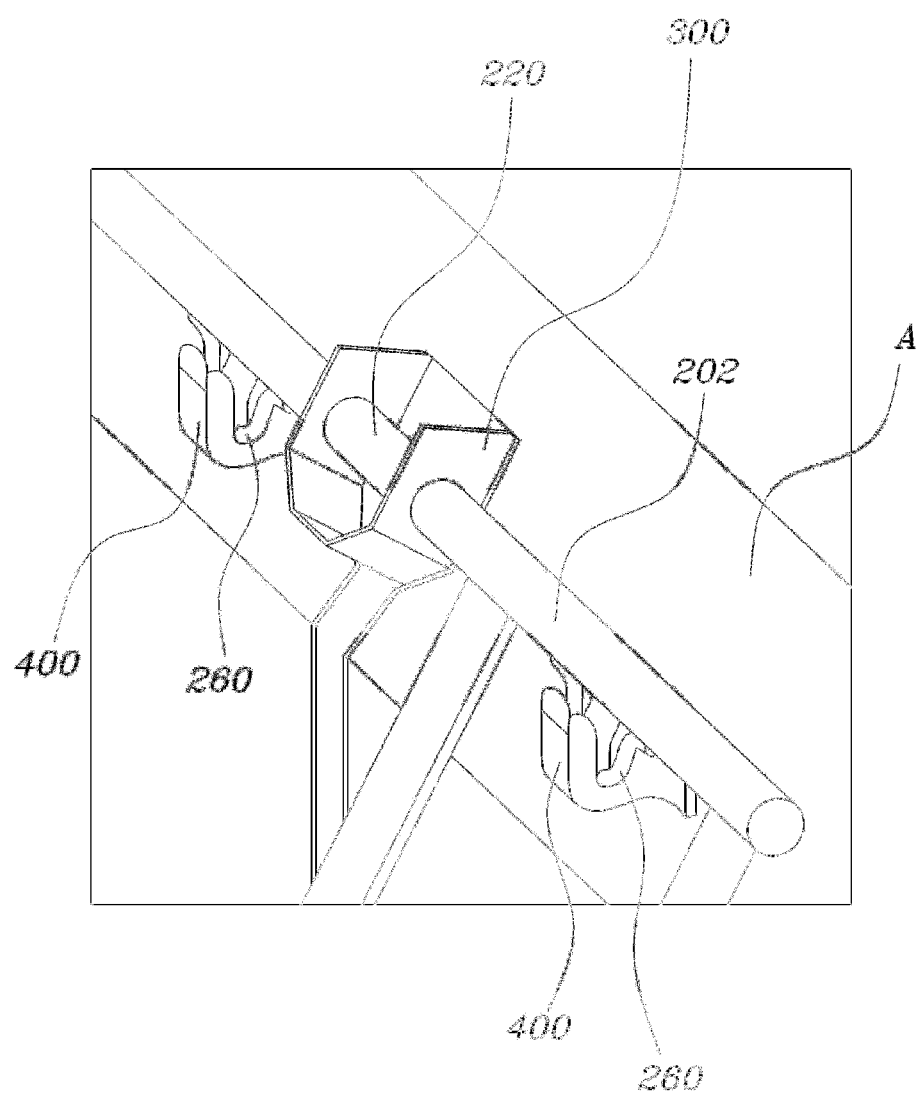

Meanwhile, as shown in FIG. 6, the apparatus according to the exemplary embodiment of the present invention may further include: a coupling element 260 disposed in the upper end 202 of the seat back frame 200, the coupling element 260 that extends downward; and a support element 400 disposed on the vehicle body A. The coupling element 260 of the seat back frame 200 may be rotatably coupled to the support element 400 and thus, the support element 400 may support the rotation of the seat back frame 200. In other words, the coupling element 260 disposed in the upper end 202 of the seat back frame 200 may be coupled to the support element 400 fixedly coupled to the vehicle body A. When the seat back frame 200 rotates in response to a rotation of the seat cushion frame 100, the angle of the seat back frame 200 may be changed at a location where the coupling element 260 is connected to the support element 400, and thus becomes the center of rotation.

The support element 400 may be open in an upper end thereof to allow the coupling element 260 to be inserted into the support element 400 from an upside to a downside (e.g., from a top to a bottom), the support element 400 being configured to surround the coupling element 260 when the coupling element 260 is inserted into the support element 400. Similarly, the support element 400 may be formed in a substantial U-shape open in an upper end thereof, and thus the coupling element 260 of the seat back frame 200 may be inserted into the open end of the support element 400 and may be engaged with the support element 400. In addition, the support element 400 may surround the coupling element 260 inserted into the support element 400. Thus, the support element 400 may operate as the center of the rotation of the seat back frame 200, and may be configured to prevent the coupling element 260 from deviating out of the support element 400.

Figure 7:
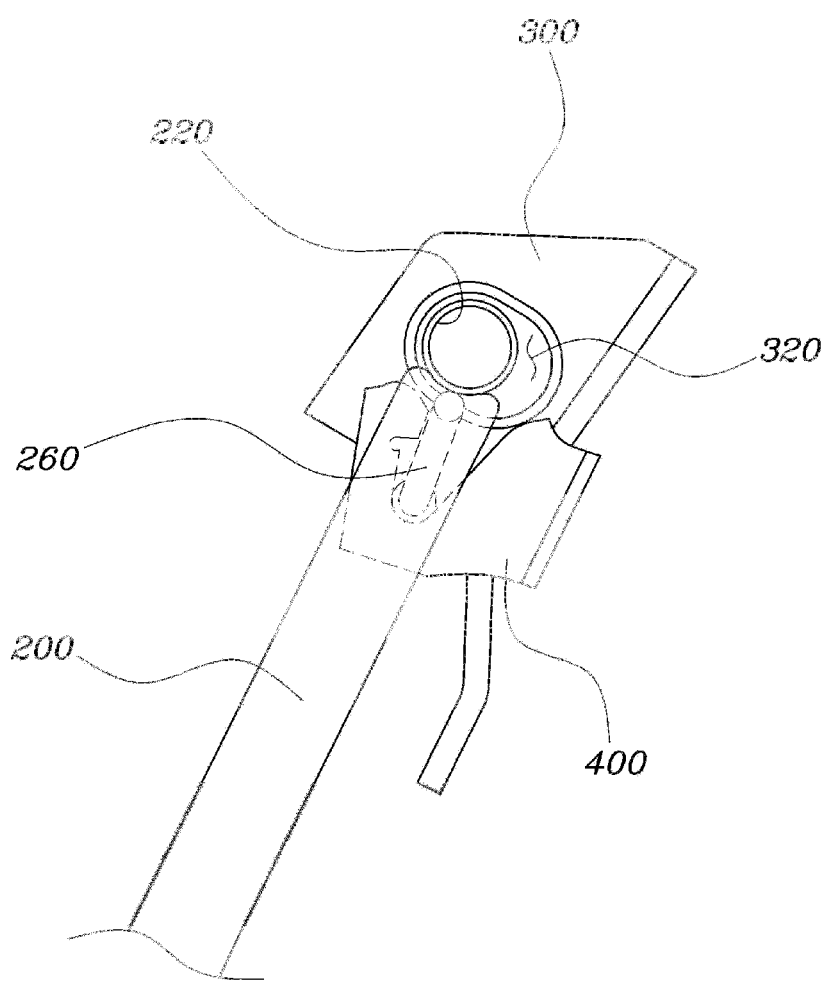
Figure 8:
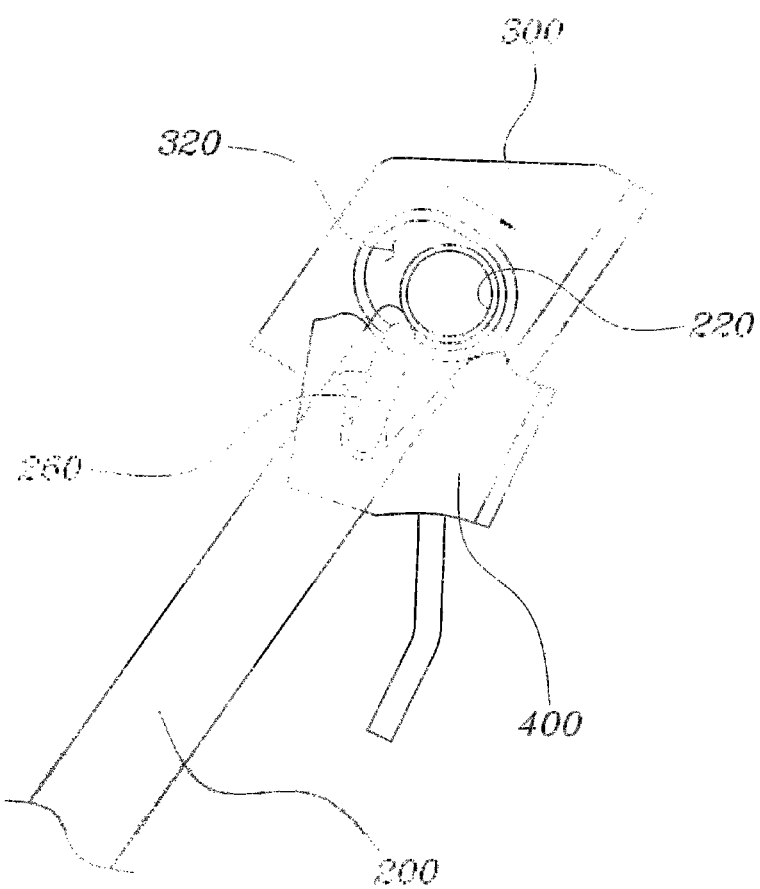

Meanwhile, as shown in FIGS. 6 to 8, the guide bracket 300 may be fixedly mounted to the vehicle body A at a location adjacent to the guide pin 220, with a guide slot 320 disposed in the guide bracket 300 by extending in a forward or a backward direction, wherein the guide pin 220 may be inserted into the guide slot 320. As shown in FIG. 1, the guide bracket 300 may be mounted to a side of the seat back frame 200, or as shown in FIG. 6, the guide bracket 300 may be mounted to an upper side of the seat back frame 200.

In particular, the guide slot 320 of the guide bracket 300 may extend upward and forward or may extend upward and downward. Similarly, the guide bracket 300 may be fixedly mounted to the vehicle body A and may be disposed adjacent to the guide pin 220; and the guide slot 320 may extend upward and forward or extend upward and downward, to allow the guide pin 220 inserted into and coupled to the guide slot 320 to move along the guide slot 320. In other words, according to the exemplary embodiment of the present invention, as the seat cushion frame 100 moves forward while rotating by the link 120, the seat back frame 200 may be configured to move upward. Thus, a variation in height of the seat back frame 200 may be reduced since the guide slot 320 disposed in the guide bracket 300 may be configured to absorb the upward movement of the seat back frame 200.

Further, the guide slot 320 may extend upward and forward or extend upward and downward. Initially, the guide pin 220 of the seat back frame 200 may be disposed on an upper side of the guide slot 320. When the seat cushion frame 100 moves while rotating, the guide pin 220 may be configured to move to a downward side of the guide slot 320, absorbing the variation in the height of the seat back frame 200.

The following is an operation of the apparatus for reclining a rear seat for a vehicle according to the exemplary embodiment of the present invention. When the seat cushion and the seat back are in initial positions, the link 120 may be folded on the floor F as shown in FIG. 2; the movable pin 240 disposed on the lower side of the seat back frame 200 may be mounted on the lower side of the slide groove 162 of the locking bracket 160 of the seat back frame 200 as shown in FIG. 4; and as shown in FIG. 7, the guide pin 220 of the seat back frame 200 may be mounted on an upper side of the guide slot 320 of the guide bracket 300 fixedly mounted to the vehicle body A.

Particularly, when the seat cushion and the seat back are reclined by an operation of the operation part 140, the seat cushion frame 100 may be configured to move forward while rotating by the rotation of the link 120, as shown in FIG. 3. Simultaneously, as shown in FIG. 5, the movable pin 240 may be configured to move from the lower side to the upper side of the slide groove 162, and as shown in FIG. 8, the guide pin 220 may be configured to move from the upper side to the lower side of the guide slot 320.

Accordingly, even though the seat cushion frame 100 moves forward while rotating, a variation in height of the seat back frame 200 may be absorbed by both the slide groove 160 of the locking bracket 160 and the guide slot 320 of the guide bracket 300. Therefore, even when the seat cushion moves and the angle of the seat back changes, the variation in height may be reduced. Thus, when the seat cushion and the seat back move, a comfortable posture of a passenger may be maintained.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for reclining a rear seat for a vehicle, comprising:
   a seat cushion frame connected to a floor via an operation part and configured to move forward while rotating when the operation part is operated, wherein a front end and a rear end of the seat cushion frame are configured to move while rotating relative to the floor, respectively, by a link;
a seat back frame having a guide pin, wherein a lower end of the seat back frame is mounted to the rear end of the seat cushion frame to be capable of sliding while rotating, and an upper end of the seat back frame is connected to a vehicle body to be capable of rotating;
a guide bracket fixedly mounted to the vehicle body, wherein the guide pin of the seat back frame is connected to the guide bracket to allow the guide pin to slide;
a coupling element disposed in an upper end of the seat back frame, the coupling element extending downward; and
a support element disposed on the vehicle body, wherein the coupling element of the seat back frame is rotatably coupled to the support element to allow the support element to support a rotation of the seat back frame.

2. The apparatus of claim 1, wherein the front end of the seat cushion frame is rotatably mounted to the floor via a first link, and the rear end of the seat cushion frame is rotatably mounted to the floor via a second link, wherein the seat cushion frame is configured to move forward while rotating by rotations of the first and the second links when the operation part is operated.

3. The apparatus of claim 1, wherein the operation part includes:
a drive motor disposed on the front end of the seat cushion frame; and
a lead screw that extends rearward from the drive motor and is connected to the floor,
wherein when the drive motor is operated, the drive motor is configured to move along the lead screw and the seat cushion frame moves while rotating.

4. The apparatus of claim 1, wherein the rear end of the seat cushion frame includes a locking bracket having a slide groove, and the lower end of the seat back frame includes a movable pin, the movable pin being engaged with the slide groove and moving along the slide groove.

5. The apparatus of claim 4, wherein the slide groove of the locking bracket extends curvedly in a direction in which the seat cushion frame moves forward while rotating when the operation part is operated.

6. The apparatus of claim 1, wherein the support element is open in an upper end thereof and the coupling element is inserted into the support element from an upside to a downside, the support element being configured to surround the coupling element when the coupling element is inserted into the support element.

7. The apparatus of claim 1, wherein the guide bracket is fixedly mounted to the vehicle body at a location adjacent to the guide pin, with a guide slot disposed in the guide bracket by extending in a forward or a backward direction, wherein the guide pin is inserted into the guide slot.

8. The apparatus of claim 7, wherein the guide slot of the guide bracket extends upward and forward.

9. The apparatus of claim 7, wherein the guide slot of the guide bracket extends upward and downward.

\* \* \* \* \*